(12) United States Patent
Cintz

(10) Patent No.: US 7,430,080 B2
(45) Date of Patent: Sep. 30, 2008

(54) INCLINED READING MAGNIFICATION STAND

(76) Inventor: Adam Cintz, 6237 Gerdts Dr., San Jose, CA (US) 95135

( * ) Notice: Subject to any disclaimer, the term of this patent is extended or adjusted under 35 U.S.C. 154(b) by 27 days.

(21) Appl. No.: 11/383,218

(22) Filed: May 14, 2006

(65) Prior Publication Data

US 2007/0273987 A1 Nov. 29, 2007

(51) Int. Cl.
*G02B 27/02* (2006.01)
*G02B 7/02* (2006.01)
(52) U.S. Cl. .................. 359/802; 359/811; 359/813
(58) Field of Classification Search ............. 359/813, 359/676, 694, 798, 802, 804, 806–808, 811, 359/815, 817–819, 822, 826; 353/22–24, 353/100–101
See application file for complete search history.

(56) References Cited

U.S. PATENT DOCUMENTS

| | | | | |
|---|---|---|---|---|
| 4,119,289 A * | 10/1978 | Kanocz | ....................... | 248/454 |
| 4,120,564 A * | 10/1978 | Rios | ........................... | 359/806 |
| 4,496,127 A * | 1/1985 | Nelson | ..................... | 248/441.1 |
| 5,377,946 A * | 1/1995 | Pannu | ....................... | 248/456 |
| 5,610,770 A * | 3/1997 | Galiani | ..................... | 359/807 |
| 6,116,562 A * | 9/2000 | Griffin | ..................... | 248/444.1 |
| 6,532,117 B2 * | 3/2003 | Taylor | ........................ | 359/803 |
| 6,574,051 B1 * | 6/2003 | Powell | ....................... | 359/802 |
| 6,595,144 B1 * | 7/2003 | Doyle | ........................ | 108/147 |
| 7,168,373 B1 * | 1/2007 | Hock | .................... | 108/147.21 |
| 7,213,794 B1 * | 5/2007 | Jefferies | ..................... | 248/460 |
| 2004/0041067 A1 * | 3/2004 | Jung | ....................... | 248/444.1 |

* cited by examiner

*Primary Examiner*—Mahidere S. Sahle
(74) *Attorney, Agent, or Firm*—Leland Wiesner; Wiesner & Associates

(57) ABSTRACT

A portable magnification stand includes a lower inner plane area surrounded by and held in place by a lower coplanar support material. A back pair of adjustable arms and a front pair of adjustable arms are mounted to the lower planar base unit and an upper planar lens unit that holds a lens for magnifying objects. The back pair of adjustable arms are longer than the front pair of adjustable arms causing the magnification of objects to appear greater near the front portion of the upper planar lens unit compared with objects near the near the back portion of the upper planar lens unit. Swingable extensions shaped as trapezoidal planar materials can be used in lieu of the adjustable arms to provide the appropriate magnification in a more compact and lighter weight design.

18 Claims, 4 Drawing Sheets

INCLINED READING MAGNIFICATION STAND

BACKGROUND

The present invention relates to magnification devices. Magnification devices are useful for people with limitations in seeing certain items or objects of interest. In the scientific arena, a great number of magnification devices have been created to see areas that a person could not see even with perfect vision. For example, the telescope and microscope are examples of magnification devices used for viewing either very distant or very small objects.

Another set of devices have been developed for people interested in looking at the details of more conventional objects that are otherwise visible. In some cases, these magnification devices can also be helpful for people with limited or less than perfect vision. For example, these magnification devices are useful in reading, identifying small items, or inspecting small parts. The typical magnification device has a magnification lens held in place using some type of frame or handle. To use these magnification devices, a user holds the handle or frame over an object to be viewed and uses the magnification offered by the device to increase the apparent size of the object. If the magnification of the lens in the handle is appropriate then the user is able to view the enlarged object more clearly and identify one or more details on the object they were otherwise unable to see.

Unfortunately, these existing magnification devices do not work well in every situation. Handheld magnification devices are difficult to use over time as the person may get tired of holding the device or, in some cases, may be unable to hold the device steady. In addition, a user may not be able to hold the magnification device at a fixed distance from the object thus causing the object to appear smaller, larger or out of focus over time. This could make the object difficult to view and possibly make the user of such a magnification device light-headed or dizzy from the rapid changes in the apparent size of the object.

Conventional magnification devices fixed in frames hold a magnification lens at a fixed distance from an object but are problematic in other ways. These magnification devices tend to be heavier and not easily adjusted for a variety of situations. For example, a user may be required to hold both the object in place with one hand while using the other hand to position the frame over the object. Further, the lens is held at a fixed distance from the object being viewed and cannot be easily modified for objects needing greater or lesser degrees of magnification.

BRIEF DESCRIPTION OF THE DRAWINGS

Like reference numbers and designations in the various drawings indicate like elements.

SUMMARY

Aspects of the present invention feature a portable magnification stand apparatus. This magnification stand includes a lower planar base unit having a a lower inner plane area surrounded by a lower coplanar support material. The lower inner plane area may be left open or optionally may have transparent material inserted therein and held in place by the lower coplanar support material; the transparent material may or may not also provide some degree of magnification. Preferably the entire lower planar base unit is constructed from transparent or translucent material to increase the overall viewing area and facilitate ease of viewing the subject matter held in place under the lower planar base unit.

In addition, the magnification stand further includes a back pair of adjustable arms mounted at a lower end of the arms near a back portion of the lower base unit to the lower coplanar support material and a front pair of adjustable arms mounted at the lower end of the arms near a front portion of the lower planar base unit to the coplanar support material. The front pair of adjustable arms are longer than the back pair of adjustable arms allowing for a person to view the underlying subject matter at an angle. For example, this would be particularly well suited for reading from an inclined position in a reclining chair or bed.

An upper planar lens unit typically holds a lens for magnifying objects in an upper inner plane area. The lens is surrounded by and held in place by a coplanar support material mounted near the front portion of the coplanar support material to the front pair of adjustable arms and mounted near the back portion of the coplanar support material to the back pair of adjustable arms. The difference in length between the front pair of adjustable arms and the back pair of adjustable arms facilitates the magnification of an object to appear greater near the front portion of the upper planar lens unit compared with the portion of the object near the near the back portion of the upper planar lens unit. This optical characteristic of the magnification stand advantageously facilitates inclined reading of subject material as often needed when a person cannot sit upright comfortably or for long periods of time and the subject material is lying on flat surface.

DETAILED DESCRIPTION

Figure 1:
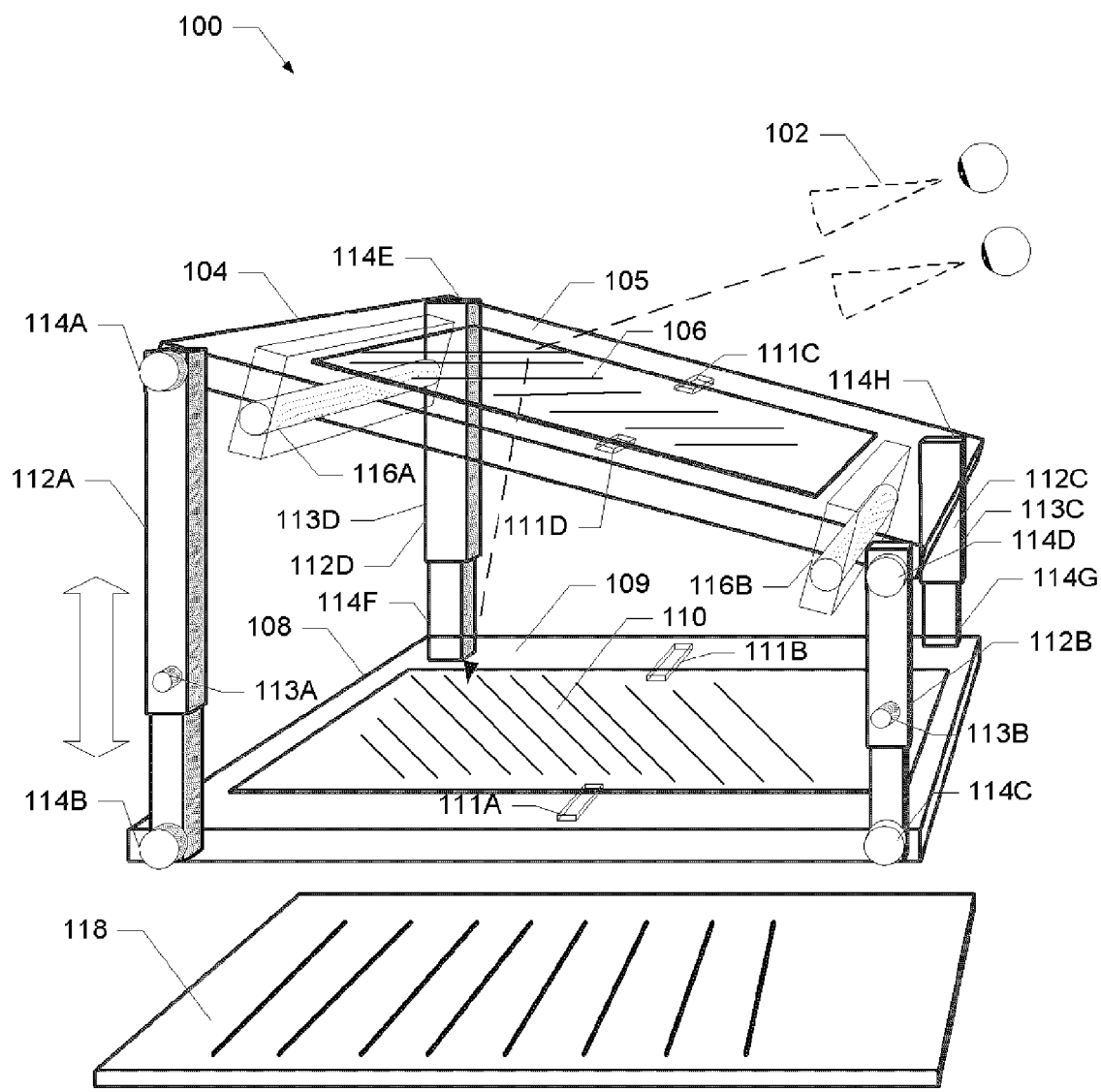
FIG. 1 is a perspective view of a reading magnification stand designed in accordance with implementations of the present invention.

Referring to FIG. 1, a reading magnification stand 100 designed in accordance with implementations of the present invention has several parts including a lower planar base unit 108, an upper planar lens unit 104, a front pair of adjustable arms 112A/112D and a back pair of adjustable arms 112B/112C between the lower planar base unit 108 and the upper planar lens unit 104.

Lower planar base unit 108 includes a lower coplanar support material 109 and is attached to the lower end of both front pair of adjustable arms 112A/112D and back pair of adjustable arms 112B/112C. Optionally, lower coplanar support material 109 may be open in the interior area or optionally may include a lower transparent material 110 with or without the ability to magnify the subject being viewed. All components of lower base unit 108 (i.e., lower coplanar support material 109 and optional lower transparent material 110) can be made of various transparent materials including plastics, polycarbonate, acrylic, polyvinylchloride, Lucite, glass and many other materials or combinations thereof. These materials allow a user to view through upper planar lens unit 104 and see an object 118 for viewing underneath. If it is implemented, the material used for lower transparent material 110 should be strong and sufficiently flexible to hold down object 118 during viewing as pressure is applied from the upper portion of reading magnification stand 100.

As illustrated in this example, coplanar support material 109 surrounds optional lower transparent material 110 and holds it in place in a lower inner plane area. Various implementations of the present invention can use glue or other similar material to secure lower coplanar support material 109 to lower transparent material 110. For added security, lower transparent material 110 can be pressure fitted to fit into lower coplanar support material 109 as well as secured using lower clips 111A/111B. Constructing lower coplanar support material 109 from one or more transparent materials previously described allows for a larger viewing area for object 118. To keep reading magnification stand 110 sturdy, lower coplanar support material 109 should be made of a thicker/stronger material compared with that selected for use in lower transparent material 110.

Each of the front pair of adjustable arms 112A/112D and back pair of adjustable arms 112B/112C may be held in place using a pair of thumb screw fasteners 114B/F and a pair of thumb screw fasteners 114C/G respectively as illustrated in this example. In various implementations, the thumb screws are tightened through a thread passing through the lower end of the arms and into the side of lower planar base unit 108. Adjusting the thumb screws allows the adjustable arms to be adjusted radially as needed for viewing object 118. Alternate implementations of the present invention can also use rivets, pins, bearings, and other devices other than thumb screws that allow the adjustable arms to be secured and/or radially adjusted.

Upper planar lens unit 104 includes a lens 106, an upper coplanar support material 105, lighting devices 116A/116B and is attached to the upper end of both front pair of adjustable arms 112A/112D and back pair of adjustable arms 112B/112C. Lens 106 can be a fresnel lens, a concave lens or any other type of lens that may be useful in viewing object 118 below. It is also contemplated that lens 106 may come in traditional round, oval or even rectangular shapes or any combination thereof. Materials used to construct lens 106 include any one or more of the transparent material previously described and may also include glass if any added weight is not a concern. The magnification strength of the lens selected can vary depending on the particular use and the amount of magnification required by the user. Because the lens can be changed out, different types of lens (i.e., fresnel or concave) may be used as well different strengths allowing a single reading magnification stand 100 to be used by different people or for different purposes. If it is cost-effective to do so, the lens may also be manufactured to provide increasing or decreasing amounts of magnification along a linear gradient measured along the length of the lens. For example, this would assist in reading at an inclined position such as from viewpoint 102.

Like the lower planar base unit 108, upper coplanar support material 105 surrounds lens 106 and secures it in place. Various implementations of the present invention can use glue or other similar material to secure upper coplanar support material 105 and lens 106. For added security, lens 106 can be pressure fitted to fit into upper coplanar support material 105 as well as secured using upper clips 111C/111D. Using upper clips 111C/111D alone to secure lens 106, allows for easier removal and changing out of lens 106 as needed. In general, upper coplanar support material 105 can also be constructed from one or more transparent materials previously described to allow for a larger viewing area for seeing object 118. To keep reading magnification stand 100 sturdy, upper coplanar support material 105 can also be made of a thicker/stronger material compared with that selected for use in lens 106.

Lighting devices 116A/116B provide additional illumination for easier viewing of object 118 being magnified. Illustrated in FIG. 1 are two lighting devices 116A/116B mounted along the front and back width portions of upper planar lens unit 104 however greater or fewer lighting devices could be included and mounted at various positions on reading magnification stand 100. For example, a single lighting device can be mounted along the length of one side of upper planar lens unit 104 or four lighting device units could be mounted along both lengths and widths of upper planar lens unit 104. Further, lighting devices 116A/116B can also be mounted in a similar manner and with a similar variety of configurations onto lower planar base unit 108 instead. Lighting devices can use lower power fluorescent bulbs, incandescent bulbs, light-emitting diodes (LED) or any combination thereof. Further, each lighting device can be powered by disposable batteries, rechargeable batteries, an alternating current and transformer providing direct current or any combination of these power sources.

Like lower planar base unit 108, the example illustrates a pair of thumb screw fasteners 114A/E and a pair of thumb screw fasteners 114D/H to hold front pair of adjustable arms 112A/112D and back pair of adjustable arms 112B/112C in place respectively. In various implementations, the thumb screws are tightened threw a thread passing through the upper end of the arms and into the side of upper planar lens unit 104. Adjusting the thumb screws allows the adjustable arms to be adjusted radially as needed for viewing object 118. Alternate implementations of the present invention can also use rivets, pins, bearings, and other devices other than thumb screws that allow the adjustable arms to be secured and/or radially adjusted.

In operation, a user places reading magnification stand 100 over object 118 for reading from viewpoint 102. If object 118 is an open book or is not quite flat, the user can apply some pressure to reading magnification stand 100 to flatten object 118 and make it easier to read. Reading magnification stand 100 is designed with the pair front adjustable arms 112A/112D to be longer than the pair of back adjustable arms 112B/112C to provide a magnification of object 118 more suitable for viewpoint 102.

For example, a user who is seated or in bed typically does not look directly down onto reading magnification stand 100 and therefore needs to have greater magnification for portions of object 118 a further distance away. By increasing the length of front adjustable arms 112A/112D compared with the back adjustable arms 112B/112C the desired magnification level is achieved. Moreover, the user may be able to read or view object 118 at an angle relative to the object 118 being held in a flat position. To view object 118 from viewpoint 102 at a greater angle, the user would increasingly adjust the length of front adjustable arms 112A/112D compared with the back adjustable arms 112B/112C until the proper magnification is achieved.

Changes in the focal length and magnification is made possible by adjusting both front adjustable arms 112A/112D and back adjustable arms 112B/112C axially. In various implementations, each adjustable arm has an inner sleeve fitted inside of an outer sleeve with sufficient clearance that the friction between the sleeves holds the inner sleeve in place with respect to the outer sleeve. To help ensure the adjustable legs do not lose position, implementations of the present invention can also include an adjustment thumb screw that passes through the outer sleeve and presses against an inner sleeve to also keep the inner sleeve in place with respect to the outer sleeve. Adjustment thumb screws 113A/113B appear in FIG. 1 on adjustable arms 112A/112B respectively while adjustment thumb screws 113D/113C are associated with adjustable arms 112D/112C but are out of view. An alternative implementation described later herein and illustrated in FIGS. 5A and 5B utilizes a pair of hinged and swingable flaps to introduce a difference in height between the front and back portions of the upper planar lens unit 104. Both the former and latter alternative case effectively enable viewing at an angle relative to the subject 118 held in a flat position.

Figure 2:
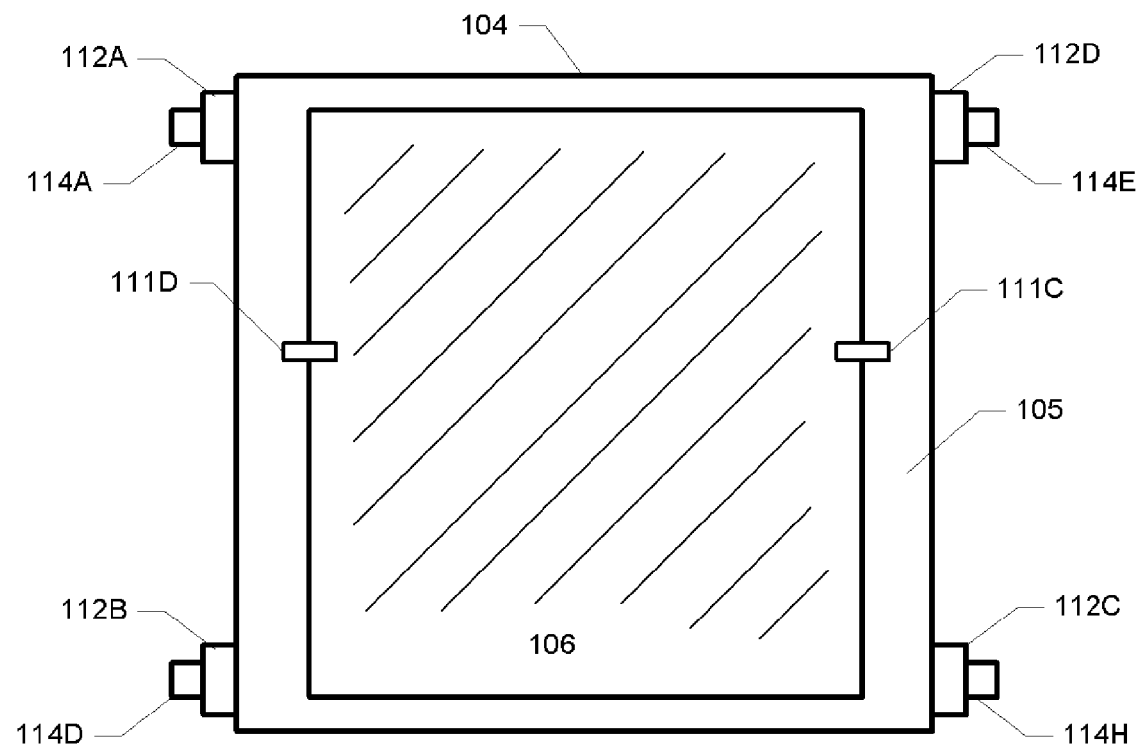
FIG. 2 is a top view of the reading magnification stand designed in accordance with implementations of the present invention.

FIG. 2 is a top view of reading magnification stand 100 designed in accordance with implementations of the present invention. From this perspective, lens 106 in upper planar lens unit 104 can be seen as it is surrounded by upper coplanar support material 105. Upper clips 111C/111D hold lens 106 in place in various implementations such as that illustrated however lens 106 can be otherwise affixed using glue, pressure fitting techniques or other securing methodologies. Both front pair of adjustable arms 112A/112D and back pair of adjustable arms 112B/112C are visible and secured on the upper end by pair of thumb screw fasteners 114A/E and a pair of thumb screw fasteners 114D/H respectively as previously described.

Figure 3:
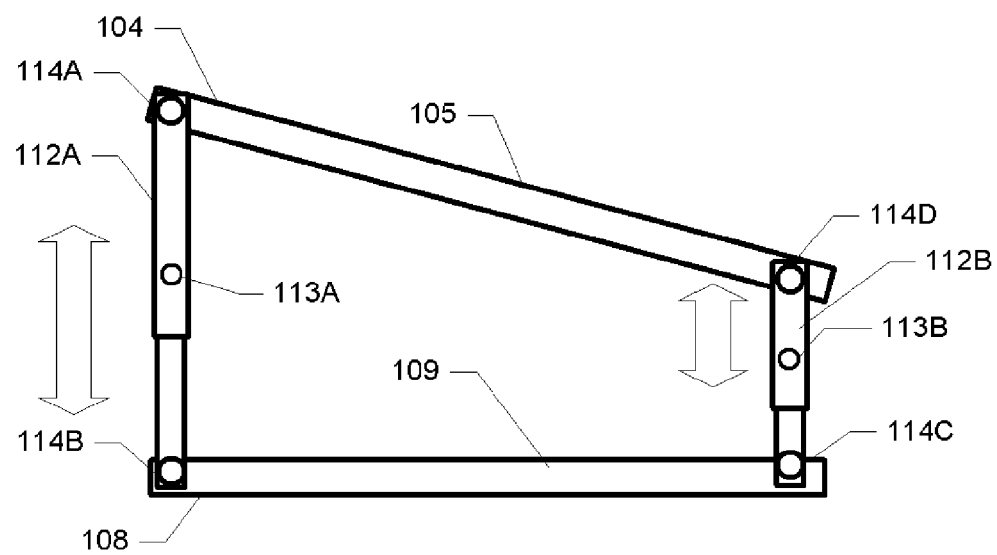
FIG. 3 is a left side elevation view of the reading magnification stand designed in accordance with implementations of the present invention.

FIG. 3 is a left side elevation view of the reading magnification stand designed in accordance with implementations of the present invention. In this figure, the side of upper coplanar support material 105 is seen in upper planar lens unit 104. Front adjustable arm 112A is longer than back adjustable arm 112B and secured on their upper and lower ends by pair of thumb screw fasteners 114A/114B and 114D/114C respectively. To secure the different lengths of front adjustable arm 112A and back adjustable arm 112*b* are adjustment thumb screws 113A/113B. Lower planar base unit 108 as seen in this left side elevation provides a side view of lower coplanar support material 109.

Figure 4:
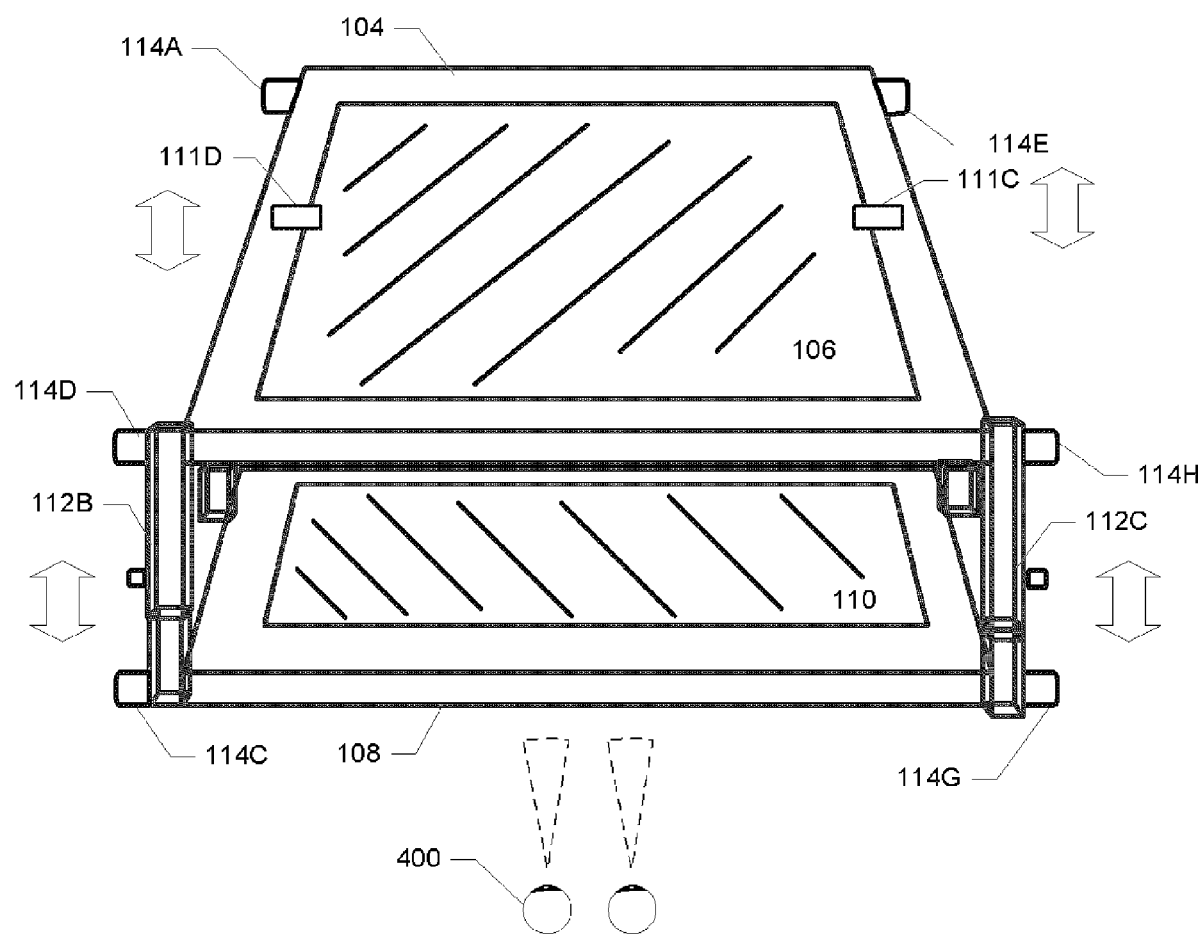
FIG. 4 is a frontal perspective view of the reading magnification stand designed in accordance with implementations of the present invention.

FIG. 4 is a frontal perspective view of the reading magnification stand 100 designed in accordance with implementations of the present invention. This frontal perspective view represents reading magnification stand 100 as seen from a user at viewpoint 400. A user at this viewpoint 400 looks through lens 106 in upper planar lens unit 104 at an angle and, optionally, through lower transparent material 110. The user preferably also sees through the material surrounding lower transparent material 110 as this should also made of a transparent material to increase the overall viewing area.

By the design of reading magnification stand 100, the magnification of an object appears greater near the front portion of upper planar lens unit 104 compared with the portion of the object near the back portion of upper planar lens unit 104. As previously described, this difference in magnification is due to the difference in length between front pair of adjustable arms 112A/112D (not visible in FIG. 4) and back pair of adjustable arms 112B/112C. This magnification helps a user at viewpoint 400 see at an angle as they are further away from the farthest portion of the object being viewed and therefore need additional magnification to see clearly.

Overall, the design and construction of reading magnification stand 100 provides an improved comfort level for a user to read and view. For example, the angled position of upper planar lens unit 104 and lens 106 obviates the need for a user to bend or "crane" ones neck and head during reading. Keeping the head and neck in a more natural position by way of reading magnification stand 100 thereby increases the comfort level and, in turn, the time one can read and view. Of course, this is a great advantage for individuals having general neck/back pain or suffering from more acute disorders due to arthritis, bone spurs, spinal/nerve damage and other conditions.

In one implementation, an object (not illustrated) below and held in place by reading magnification stand 100 can range in size from 6 inches to 12 inches in height and 4 inches to 24 inches in width. If the width and height of lower transparent material 110 covers at least the dimensions of the object then the user does not need to slide reading magnification stand 100 over object to see any portion of the image magnified. It is contemplated that objects larger than 12 inches in height and 24 inches in width could also be viewed using a reading magnification stand of corresponding larger dimensions. Accordingly, the only limitation on the size of reading magnification stand 100 is the corresponding practicality and cost associated with making a larger stand that may be heavier and more cumbersome to handle.

Figure 5A:
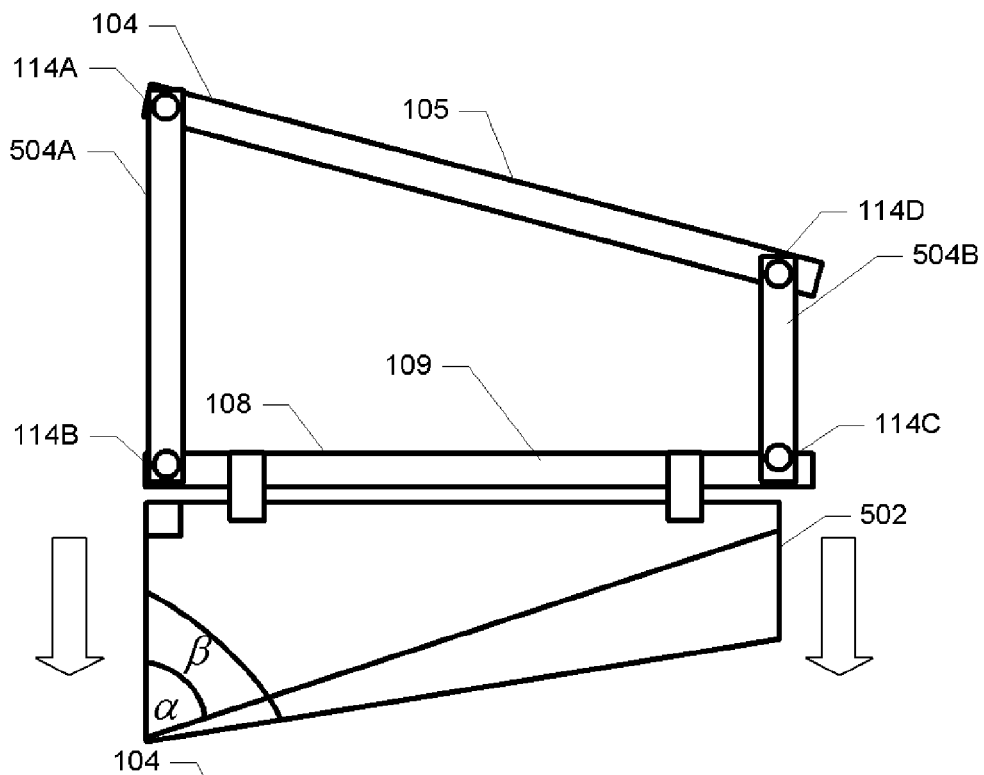
FIG. 5A is a left side elevation view of the reading magnification stand elevated with a pair swingable extensions designed in accordance with implementations of the present invention.

FIG. 5A is a left side elevation view of the reading magnification stand elevated with a pair of swingable extensions or flaps designed in accordance with implementations of the present invention. In this alternate implementation, the height of the upper planar lens unit 104 is fixed in position using non-adjustable arms and then modified by swinging the extensions in a downwardly position as illustrated. In this figure, the side of upper coplanar support material 105 is positioned in upper planar lens unit 104. Front arm 504A is not adjustable in length but designed to be longer than back arm 504B and secured on their upper and lower ends by pair of thumb screw fasteners 114A/114B and 114D/114C respectively. Another front arm and back arm operate in a similar manner but are not visible in this particular elevation view of FIG. 5A.

In this implementation, the height of upper planar lens unit 104 is modified by either extending a trapezoidal planar material 502 downward or retracting it upward. Trapezoidal planar material 502 is swingably attached along parallel lengths of the lower base unit 108 and capable of being positioned downwardly in a perpendicular position to the lower base unit 108 in order to increase a height of the front portion of the lower base unit 108 a greater amount compared with an increase in height of the back portion of the lower base unit 108.

This increases the differential in height of the front portion of upper planar lens unit 104 compared with the back portion of upper planar lens unit 104 according to an angle $\alpha$ or $\beta$. Trapezoidal planar material 502 configured with angle $\alpha$ tends to increase the differential in height more than trapezoidal planar material configured with angle $\beta$ since $\alpha$ sweeps a smaller angle compared with $\beta$. Moreover, $\alpha$ may provide higher magnification at the top portion of upper planar lens unit 104 compared with the back portion of upper planar lens unit 104 depending on the construction of the magnifying lens and other aspects of the present invention. Further, it is contemplated that trapezoidal planar material 502 can be created having multiple selectable angles α, β or other angles and folded depending on the magnification and angle of viewing. It should be understood that trapezoidal planar material 502 can be made of Plexiglas, plastic, metal or any other material capable of supporting the weight when extended in a downward position. It is also contemplated that various hinges and other similar devices could be used to attach trapezoidal planar material 502 to other portions of the device as well as facilitating folding to achieve various different angles for the device.

Figure 5B:
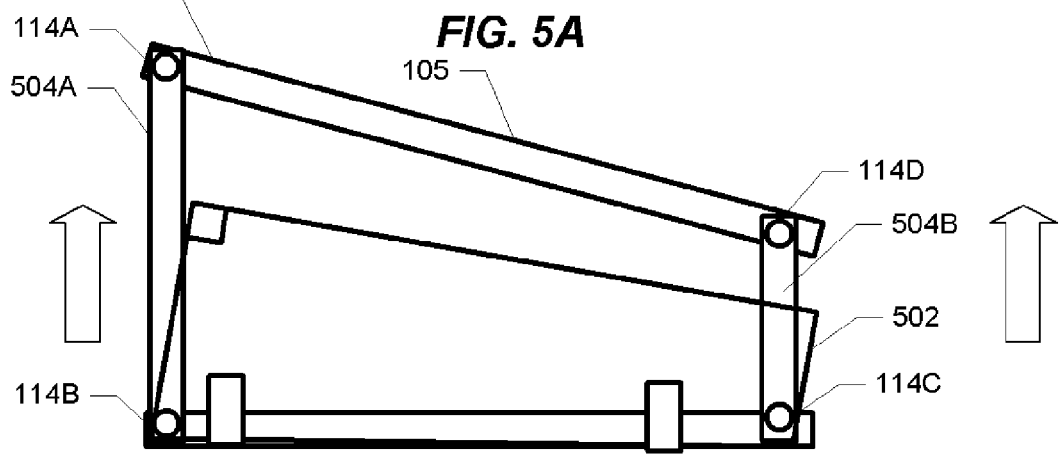
FIG. 5B is a left side elevation view of the reading magnification stand with a pair of retracted swingable extensions designed in accordance with implementations of the present invention.

FIG. 5B is another left side elevation view of the reading magnification stand with the pair of swingable extensions retracted in accordance with implementations of the present invention. The pair of trapezoidal planar materials 502 each swingably attached along parallel lengths of the lower base unit 108 is further capable of being positioned upwardly in a perpendicular position to the lower base unit to reduce the overall profile of the apparatus. Essentially, the height of the upper planar lens unit 104 is reduced by swinging the extensions in an upwardly position as illustrated in FIG. 5B. Even with the trapezoidal planar materials 502 positioned upwardly, the front arm 504A is designed to be longer than back arm 504B and secured on their upper and lower ends by pair of thumb screw fasteners 114A/114B and 114D/114C respectively. Once again, the other pair of front arm and back arm operate in a similar manner but are not visible in this particular elevation view of FIG. 5B.

Figure 5C:
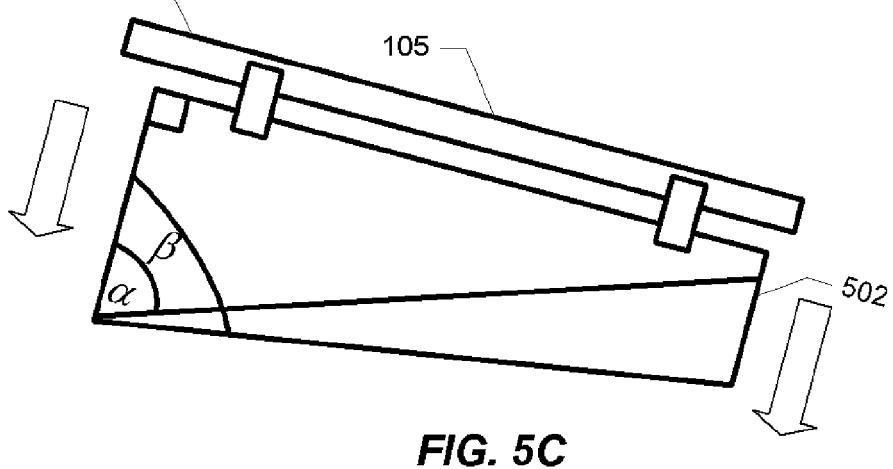
FIG. 5C is a left side elevation view of the reading magnification stand with a pair of extended swingable extensions attached directly to an upper planar lens unit in accordance with implementations of the present invention.

Yet another implementation illustrated in FIG. 5C provides a more simplified and compact design. From the left side elevation view of this implementation in FIG. 5C it can be seen that a pair of trapezoidal planar materials 502 are directly attached to upper planar lens unit 104 by way of a pair of hinges. This design accentuates the portability and storage advantages of using the swingable extensions or flaps as they can be made to collapse and render reading magnification stand 100 almost completely flat.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A portable magnification stand apparatus, comprising:
   a lower planar base unit having a lower inner plane area surrounded by a lower coplanar support material for supporting an object being viewed by a user;
   a back pair of adjustable arms having a shorter length mounted at a lower end of the back pair of arms near a back portion of the lower planar base unit to the lower coplanar support material;
   a front pair of adjustable arms having a longer length compared to the shorter length of the back pair of arms and mounted at the lower end of the front pair of arms near a front portion of the lower planar base unit to the lower coplanar support material;
   a pair of trapezoidal planar materials each swingably attached along parallel lengths of the lower planar base unit and capable of being positioned downwardly in a perpendicular position to the lower planar base unit in order to increase a height of the front portion of the lower planar base unit a greater amount compared with an increase in height of the back portion of the lower planar base unit and the pair of trapezoidal planar materials each swingably attached along parallel lengths of the lower planar base unit are further capable of being positioned upwardly in a coplanar position to the lower base unit to reduce the overall profile of the apparatus compared when the attached pair of trapezoidal planar materials are positioned downward;
   an upper planar lens unit that holds a lens for magnifying objects in an upper inner plane area surrounded by and held in place by an upper coplanar support material mounted near the front portion of the upper coplanar support material to the front pair of adjustable arms having the longer length and mounted near the back portion of the upper coplanar support material to the back pair of adjustable arms having the shorter length causing the magnification of an object to appear greater on portions of the object a further distance away from the user's view near the front portion of the upper planar lens unit compared with the portion of the object near the near the back portion of the upper planar lens unit due to the non-parallel position of the upper planar lens unit compared to the lower planar base unit.

2. The apparatus of claim 1 wherein the lower coplanar support material in the lower inner plane area is selected from a set of transparent materials including plastic, polycarbonate, acrylic, polyvinylchloride (PVC), Lucite and glass and facilitates a larger viewing area of the object being magnified by the upper planar lens unit.

3. The apparatus of claim 1 wherein the back pair of adjustable arms and front pair of adjustable arms are both mounted at the lower end of the arms to the edge of the lower planar base unit using a corresponding pair of thumb screw fasteners and mounted at the upper end of the arms to the edge of the upper planar lens unit using a corresponding pair of thumb screw fasteners.

4. The apparatus of claim 1 wherein the back pair of adjustable arms and front pair of adjustable arms each adjust axially to change the distance between the lower planar base unit and upper planar lens unit and adjust the magnification of an object.

5. The apparatus of claim 4 wherein the back pair of adjustable arms and front pair of adjustable arms each have an inner sleeve filled inside of an outer sleeve with sufficient clearance that the friction therebetween holds the inner sleeve in place with respect to the outer sleeve when adjusted axially.

6. The apparatus of claim 1 wherein the back pair of adjustable arms and front pair of adjustable arms each have an inner sleeve and an outer sleeve with an adjustment thumb screw that passes though the outer sleeve and presses against an inner sleeve keeping the inner sleeve in place with respect to the outer sleeve when adjusted axially.

7. The apparatus of claim 1 wherein one or more lighting devices are mounted on the upper planar lens unit to illuminate the objects being magnified.

8. The apparatus of claim 7 wherein the lighting devices are powered using a power source selected from a set of power sources including: one or more disposable batteries, one or more rechargeable batteries and an alternating current connected to a transformer for providing direct current.

9. The apparatus of claim 1 wherein the lower coplanar support material is transparent and holds the transparent material in the lower inner plane area in place using one or more clips.

10. The apparatus of claim 1 wherein the lower planar base unit holds in place reading material selected from a set of reading materials including an open book, a newspaper, an open magazine.

11. The apparatus of claim 1 wherein the lower planar base unit holds in place reading material ranging from 6 inches to 12 inches in height and 4 inches to 24 inches in width.

12. The apparatus of claim 1 wherein the lens in the upper planar lens unit is a lens selected from a set of lens including: a fresnel lens and a convex lens.

13. The apparatus of claim 1 wherein the lens in the upper planar lens occupies an area ranging from 6 inches to 12 inches in height and from 4 inches to 24 inches in width.

14. A portable magnification stand apparatus, comprising:
a lower planar base unit having a lower inner plane area surrounded by a lower coplanar support material for supporting an object being viewed by a user;
a back pair of arms having a shorter length mounted at a lower end of the back pair of arms near a back portion of the lower planar base unit to the lower coplanar support material;
a front pair of arms having a longer length compared to the shorter length of the back pair of arms and mounted at the lower end of the front pair of arms near a front portion of the lower planar base unit to the lower coplanar support material;
a pair of trapezoidal planar materials each swingably attached along parallel lengths of the lower planar base unit and capable of being positioned downwardly in a perpendicular position to the lower planar base unit in order to increase a height of the front portion of the lower planar base unit a greater amount compared with an increase in height of the back portion of the lower planar base unit and the pair of trapezoidal planar materials each swingably attached along parallel lengths of the lower planar base unit are further capable of being positioned upwardly in a coplanar position to the lower base unit to reduce the overall profile of the apparatus compared when the attached pair of trapezoidal planar materials are positioned downward;
an upper planar lens unit that holds a lens for magnifying objects in an upper inner plane area surrounded by and held in place by an upper coplanar support material mounted near the front portion of the upper coplanar support material to the front pair of arms having the longer length and mounted near the back portion of the upper coplanar support material to the back pair of arms having the shorter length causing the magnification of an object to appear greater on portions of the object a further distance away from the user's view near the front portion of the upper planar lens unit compared with the portion of the object near the near the back portion of the upper planar lens unit due to the non-parallel position of the upper planar lens unit compared to the lower planar base unit.

15. The apparatus of claim 14 wherein the lower transparent material in the lower inner plane area is selected from a set of transparent materials including plastic, polycarbonate, acrylic, polyvinylchloride (PVC), Lucite and glass and facilitates viewing the object for magnification by the upper planar lens unit.

16. The apparatus of claim 14 wherein one or more lighting devices are mounted on the upper planar lens unit to illuminate the objects being magnified.

17. The apparatus of claim 16 wherein the lighting devices are powered using a power source selected from a set of power sources including: one or more disposable batteries, one or more rechargeable batteries and an alternating current connected to a transformer for providing direct current.

18. A portable magnification stand apparatus, comprising:
a lower planar base unit having a lower inner plane area surrounded by a lower coplanar support material for supporting an object being viewed by a user;
an upper planar lens unit that holds a lens for magnifying objects in an upper inner plane area surrounded by and held in place by an upper coplanar support material in a non-parallel position relative to the lower planar base unit;
a pair of trapezoidal planar materials each swingably attached along parallel lengths of the upper planar lens unit and capable of being positioned downwardly in a perpendicular position to the upper planar lens unit in order to increase the height of a front portion of the upper planar lens unit a greater amount compared with the increase in height of a back portion of the upper planar lens unit thereby causing the magnification of an object to appear greater near the front portion of the upper planar lens unit compared with the portion of the object near the back portion of the upper planar lens unit and further capable of being positioned upwardly in a coplanar position to the lower planar base unit to reduce the overall profile of the apparatus compared when the attached pair of trapezoidal planar materials are positioned downward.

* * * * *